US009021557B2

(12) United States Patent
Leneel

(10) Patent No.: US 9,021,557 B2
(45) Date of Patent: Apr. 28, 2015

(54) SYSTEM AND METHOD FOR SECURITY USING A SIBLING SMART CARD

(75) Inventor: Olivier Leneel, Singapore (SG)

(73) Assignee: STMicroelectronics Pte Ltd, Singapore (SG)

( * ) Notice: Subject to any disclaimer, the term of this patent is extended or adjusted under 35 U.S.C. 154(b) by 206 days.

(21) Appl. No.: 13/283,381

(22) Filed: Oct. 27, 2011

(65) Prior Publication Data
US 2013/0111555 A1    May 2, 2013

(51) Int. Cl.
| | |
|---|---|
| G06F 21/00 | (2013.01) |
| G06F 21/34 | (2013.01) |
| H04L 29/06 | (2006.01) |
| H04L 9/08 | (2006.01) |
| G06F 21/44 | (2013.01) |
| G06F 21/62 | (2013.01) |
| G06F 21/60 | (2013.01) |
| G06F 15/16 | (2006.01) |
| H04W 12/08 | (2009.01) |
| H04W 12/00 | (2009.01) |

(52) U.S. Cl.
CPC ............. *G06F 21/34* (2013.01); *H04L 63/068* (2013.01); *H04L 9/0816* (2013.01); *H04L 9/0838* (2013.01); *H04L 9/0869* (2013.01); *H04L 9/0861* (2013.01); *H04L 63/0853* (2013.01); *H04W 12/08* (2013.01); *G06F 21/44* (2013.01); *G06F 21/62* (2013.01); *H04W 12/00* (2013.01); *G06F 21/6245* (2013.01); *G06F 21/60* (2013.01); *G06F 21/445* (2013.01); *G06F 15/16* (2013.01)

(58) Field of Classification Search
CPC ........... G06F 21/44; G06F 21/06; H04L 9/08; H04L 63/04; H04L 63/06; H04L 63/08; H04W 4/008
USPC .................. 726/1–21, 26–30; 713/164–173, 713/182–186; 380/255–43, 28; 455/410–411, 41.1–41.3
See application file for complete search history.

(56) References Cited

U.S. PATENT DOCUMENTS

| | | | |
|---|---|---|---|
| 5,629,508 | A | 5/1997 | Findley, Jr. et al. |
| 7,080,037 | B2 | 7/2006 | Burger et al. |
| 7,181,017 | B1 | 2/2007 | Nagel et al. |
| 7,340,439 | B2 | 3/2008 | Burger et al. |

(Continued)

OTHER PUBLICATIONS

Rasmussen, Kasper Bonne, et al. "Proximity-based access control for implantable medical devices." Proceedings of the 16th ACM conference on Computer and communications security. ACM, 2009.*

(Continued)

*Primary Examiner* — Madhuri Herzog
(74) *Attorney, Agent, or Firm* — Gardere Wynne Sewell LLP

(57) ABSTRACT

A system and method for realizing specific security features for a mobile device that may store sensitive and private data by providing secured communications to a paired remote device. In this respect, both the mobile device (which may be a mobile phone, for example) and the paired remote device (which may be a keychain, for example) include a SIM card that may have identification data stored therein. Once paired, the two devices may communicate encrypted security messages back and forth in order to implement various security measures to protect data and wireless communications. Such messages may be generated from initial information known only to each respective device such as a randomly generated offset number and a common time reference.

25 Claims, 3 Drawing Sheets

(56) References Cited

U.S. PATENT DOCUMENTS

| | | | |
|---|---|---|---|
| 7,725,717 B2* | 5/2010 | Roux et al. | 713/168 |
| 7,756,478 B2* | 7/2010 | Eisenbach | 455/41.2 |
| 8,045,961 B2* | 10/2011 | Ayed et al. | 455/411 |
| 8,775,801 B2* | 7/2014 | Tamura et al. | 713/166 |
| 2004/0014423 A1* | 1/2004 | Croome et al. | 455/41.2 |
| 2004/0029563 A1* | 2/2004 | Berg | 455/410 |
| 2004/0143750 A1* | 7/2004 | Kulack et al. | 713/200 |
| 2005/0105734 A1 | 5/2005 | Buer et al. | |
| 2006/0083187 A1* | 4/2006 | Dekel | 370/310 |
| 2010/0090831 A1* | 4/2010 | Zhao et al. | 340/572.1 |
| 2011/0110522 A1* | 5/2011 | Kwon | 380/270 |
| 2011/0126014 A1* | 5/2011 | Camp et al. | 713/171 |

OTHER PUBLICATIONS 1. http://www.mobilecommercedaily.com/70-percent-of-smartphone-owners-use-mobile-financial-services-study/.

2. Data Encryption Standard http://csrc.nist.gov/publicationsfiips/fips46-3/fips46-3.pdf.

* cited by examiner

SYSTEM AND METHOD FOR SECURITY USING A SIBLING SMART CARD

BACKGROUND

Many devices, including laptop computers, smart phones, and other portable computing devices, utilize personal and confidential information in varying applications that a user chooses to install on such devices. Personal and confidential information is sometimes necessary to provide specific services to the user, such as mobile banking and the like. Further, portable computing devices are being used more and more for wallet functionality whereby a user may use the mobile device to pay for goods and services at a point of sale. As this kind of functionality becomes more and more prevalent, the need for security arises in unison to prevent unauthorized users from conducting fraudulent transactions or otherwise misusing personal and confidential information stored in a mobile device.

One conventional solution often employed to prevent such unauthorized use is to use password protection for operating a mobile device. However, sometimes, such password protection is intentionally disabled by the user during times of high use or inadvertently when using the mobile device. Further, if a person accidentally leaves a mobile device behind, the mobile device may have recently been used such that the system has not yet entered into a password-protected mode of operation, e.g., sleep or power-down, such that an unauthorized user may use various applications without the need to enter a password again. These and other problems leave mobile devices susceptible to fraudulent use as more and more people are choosing to use these devices for sensitive tasks.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

Figure 1:
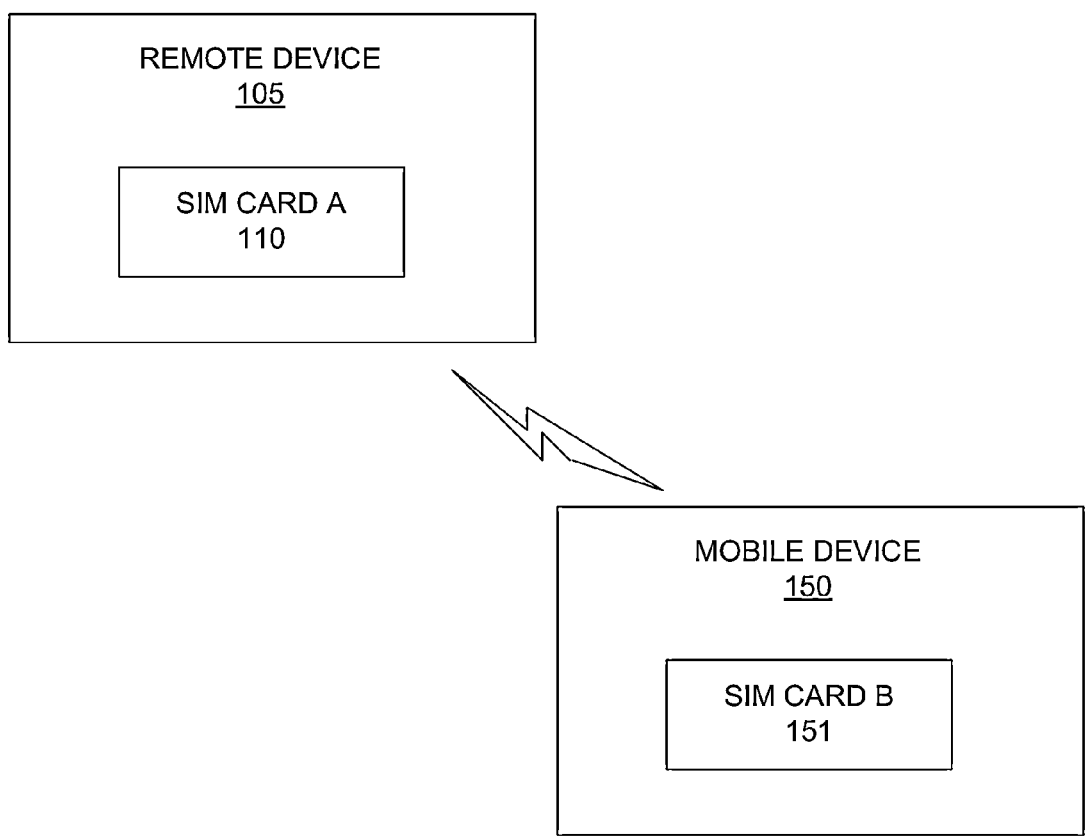
FIG. 1 shows a block diagram of a system for realizing mobile device security using a first secure SIM card in a mobile device paired with a second secure SIM card in a remote key device according to an embodiment of the subject matter discussed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for realizing specific security features for a mobile device that may store sensitive and private data by providing secured communications to a paired remote device. In this respect, both the mobile device (which may be a mobile phone, for example) and the paired remote device (which may be a keychain, for example) include a SIM card (or any other kind of identification circuit) that may have identification data stored therein. Once paired, the two devices may communicate security messages back and forth in order to implement various security measures to protect data and wireless communications. Such messages may be generated from initial information known only to each respective device such as a randomly generated offset number and a common time reference.

In embodiments, the remote device may provide a secured message to the mobile device in order to decrypt some protected data. Further, in other embodiments, the remote device may be actuated to allow the paired mobile device to engage in certain wireless communications, such as the initiation of a financial transaction. The remote device SIM card ensures encryption codes are initialized and established with the SIM card of the mobile device. In this respect, the encryption code is used by both the remote device to send coded enable signals to the mobile device to decrypt the message as a dual key security method. The encryption codes may be associated with a pseudo-random number generated as well as a common reference time with a Vernan Cifer based algorithm unique to each SIM card pairing, e.g., sibling SIM cards.

Using sibling SIM cards that communicated with each other in a wireless and encrypted manner introduces a further security level into the usage of mobile devices. The additional security levels are provided through a device having a form factor that may be part of a person's everyday items, such as a credit card in a wallet or a wrist-watch. One advantage of using sibling SIM cards between two devices allows a user to actively control decrypting of sensitive and private data or enacting a financial transaction via passive proximity communications between two devices. That is, if a remote device (such as a keychain) is not proximate to a mobile device (such as a smart phone), certain data in the phone may be encrypted and certain functionality of the phone may be locked out. Further, with such small and passive communications between two devices for realizing such security, the remote security companion device may be run efficiently on a single battery for great lengths of time. These and other aspects are discussed below with respect to FIGS. 1-5.

FIG. 1 shows a block diagram of a system 100 for realizing mobile device security using a first secure SIM card 151 in a mobile device 150 paired with a second secure SIM card 110 in a remote key device 105 according to an embodiment of the subject matter discussed herein. As discussed briefly above, mobile devices, such as mobile device 150, may have sensitive or confidential data stored therein. Such a mobile device 150 may be, for example, a smart phone, a personal data assistant, a laptop computer or the like. As such, the manner in which these kinds of devices are now being used often means that specific and detailed private information is stored at the device 150 such that financial transactions and other data exchanges may be accomplished. In order to provide additional security for such sensitive data, the mobile device 150 may be in relative constant communication (for example, through common wireless communication protocols, e.g., Bluetooth™ and the like) with a paired remote device 105 so as the allow the designated sensitive data to be unencrypted and usable. Once paired, the SIM card 151 of the mobile device 150 and the SIM card 110 of the remote device 105 may be referred to as sibling SIM cards. As is discussed further below, different communication interactions and methods may be established for realizing security for private data stored on the mobile device 150.

The remote device 105 may be integrated with a number of different form factors and/or multipurpose devices. Thus, in on embodiment, the remote device may be credit card size electronic device such that it may fit in a wallet of a user. In another embodiment, the electronics of the remote device may be physically integrated in a wrist watch for a phone owner who may not always carry a wallet. Other embodiments may include a keychain form factor, an earpiece or headset device, or a mobile media player. With today's level of integration density of electronics, a cumulative surface of less than 1 $cm^2$ is all that may be needed to realize the circuit. This size allows a large spectrum of integration capabilities to be suitable to a large spectrum of user's choices.

Additionally, the methods described below may be fixed in a computer-readable storage medium having computer executable instructions that are operable to be executed on one or more computers or processors. Such a computer readable storage medium may be a memory such as RAM, ROM, flash drive, programmable arrays, disks, or any other storage medium capable of storing digital information.

Figure 2:
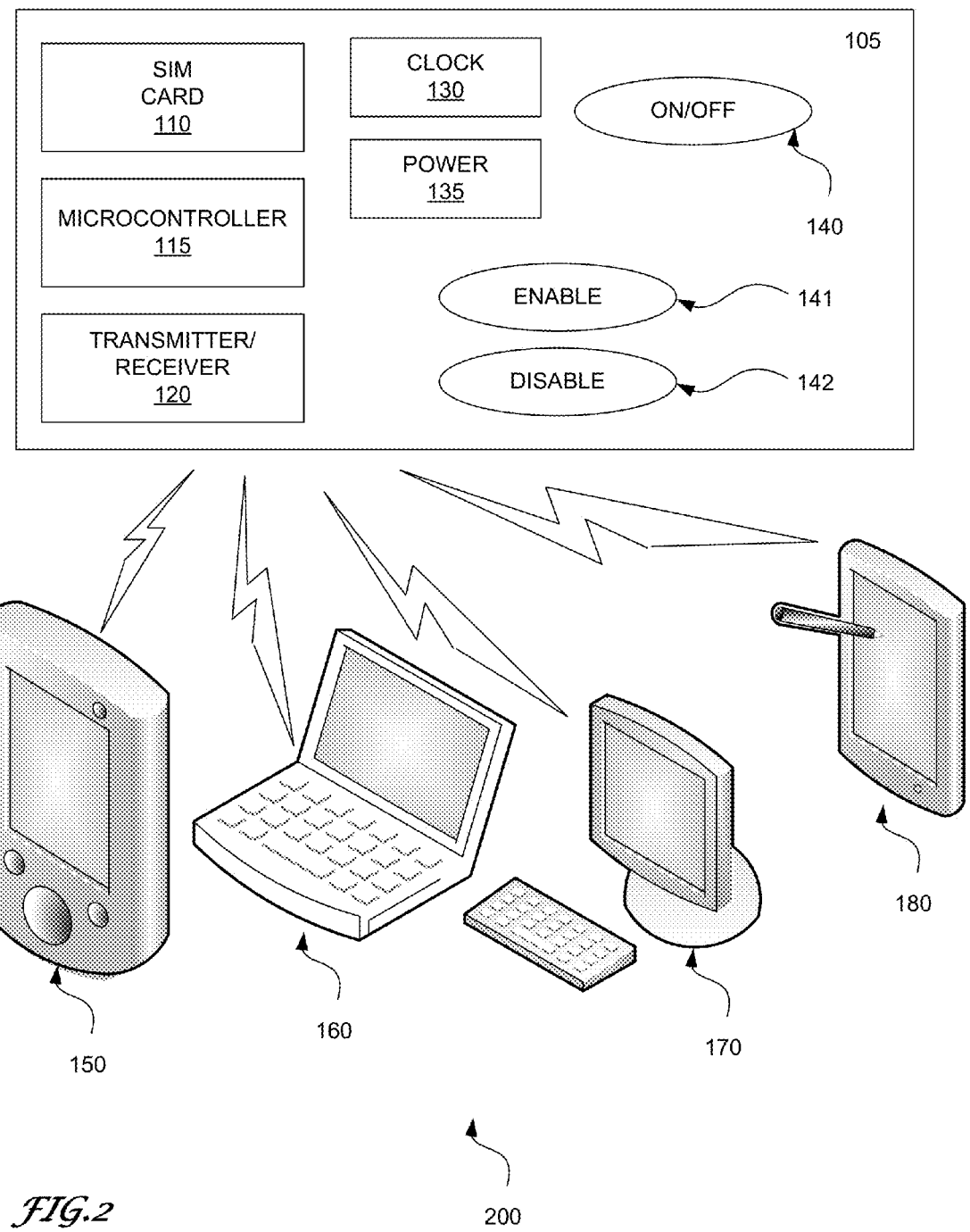
FIG. 2 shows a block diagram of a system for realizing mobile device security using the remote key of FIG. 1 that may be paired with one or more of several different mobile devices according to an embodiment of the subject matter discussed herein.

FIG. 2 shows a block diagram of a system 200 for realizing mobile device security using the remote device 105 of FIG. 1 that may be paired with one or more of several different mobile devices according to an embodiment of the subject matter discussed herein. In this system 200, a remote device 105 may be paired with one or more mobile devices such that at least some data stored on these mobile devices may be secured via an encryption method or other security measure. Such devices may include a smart phone 150, a laptop computer 160, a personal computer 170, and a personal data assistant 180. As such, each of these devices may be simultaneously paired with the remote device 105 to realize security as described below. In this sense, each "pair" of device have SIM cards therein that may be referred to as sibling SIM cards.

Although not shown in FIG. 2, each of these devices may include its own respective SIM card that may be paired with the SIM card 110 of the remote device 105. For the remainder of this disclosure, only one mobile device (a smart phone 150) will be discussed in conjunction with a system and method for realizing security on the mobile device using a paired remote device 105.

As briefly mentioned above, the remote device 105 includes a SIM card 110 that may be synchronized with content corresponding to the SIM card of the smart phone 150. Additionally, the remote device 105 includes a transmitter/receiver 120 configured to facilitate wireless communications with a corresponding transmitter/receiver in the smart phone 150. One protocol for communications may be Bluetooth™ using variable frequencies in the 2.4 GHz spectrum, but any wireless communications protocol may be used.

Further, the remote device 105 includes a microcontroller 115 and an internal clock 130 that may be used during the process of synchronization with the smart phone 150 and other control procedures. Such an internal clock 130 may be used by the controller 115 to tune to a given frequency that depends on a time reference synchronized between the smart phone 150 and remote device 105. The time synchronization procedure is discussed in greater detail below with respect to FIG. 3.

Still referring to FIG. 2, the remote device 105 may also include a power management circuit 135. The power management circuit 135 is used to limit the power consumption of the remote device during various operations. For example, if no mobile device is detected for some time, the remote device 105 may be switched to a standby or off mode in order to preserve battery power when use is not needed. In other embodiments, different power modes may be engaged to only allow some functionality when a user wishes to preserve battery power. For example, in one power management schema, the power to the remote device 105 may have a screen turned off after 10 seconds. Further, after 30 seconds, any wireless connectivity may be turned off. Lastly, after one minute, the phone may enter a standby mode wherein all but minimal power is turned off.

The remote device 105 includes a number of pushbuttons to engage functionality by a user. Such pushbuttons, when actuated, will cause the microcontroller to initiate a control procedure such as unencrypting data, allowing a financial transaction or turning the remote device on or off. The pushbuttons include an on/off button 140 to enable or disable all functionality of the remote device. The remote device 105 also includes an enable pushbutton 141 and a disable pushbutton 142. The enable button 141 may be used to allow a financial transaction, for example, while the disable button 142 may be used to engage decryption of specific data on the protected mobile device, as another example. These and other procedures are discussed below with respect to FIGS. 4 and 5. However, the establishing of the security relationship between the remote device 105 and a smart phone 150 is first discussed next with respect to FIG. 3.

Figure 3:
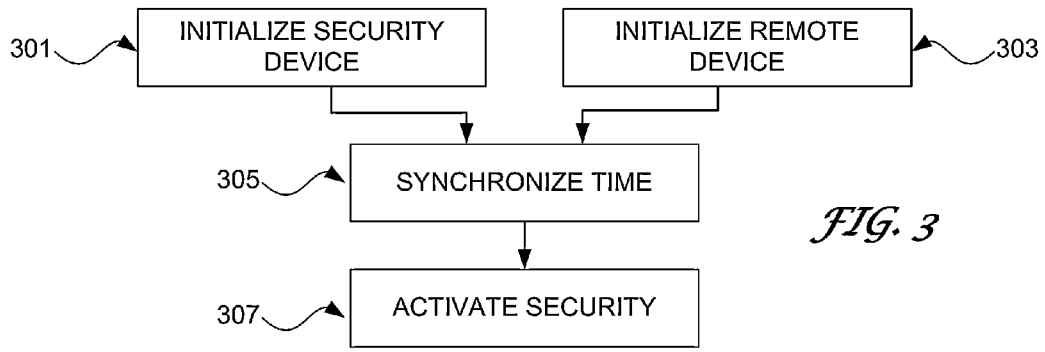
FIG. 3 shows a flow chart diagram of a method for initiating mobile device security using the remote key of FIG. 1 and a paired mobile device according to an embodiment of the subject matter discussed herein.

FIG. 3 shows a flow chart diagram of a method for initiating mobile device security using the remote device 105 of FIG. 1 and a paired mobile device according to an embodiment of the subject matter discussed herein. One way that the remote device 105 realizes security for content that may be stored on a mobile device is through automatic encryption of the content if a remote device with a matching SIM card is not detected consistently over intervals (for example, once every minute). Thus, in order to establish this symbiotic relationship between a mobile device and a paired remote device, an initial synchronization procedure may be accomplished. This procedure may begin by initializing both the remote device at step 301 and the mobile device at step 303 to be ready for communications between them. Initialization may include turning on each device as well as opening a channel for communications, For example, the mobile device may be set to discover (e.g., receive) wireless enables components and the remote device may be set to transmit a wireless signal.

Through known handshaking techniques, the mobile device and the remote device may then establish a wireless communication relationship, e.g., pairing. For example, the remote device may connect to the mobile device by using a Bluetooth™ RF transmission while a Bluetooth-enabled transmitter/receiver of the mobile device is active. The remote device may send a signal by using a code associated in the SIM card of the remote device. The mobile phone may receive the signal and correlate it by using the similar code associated with the SIM card of the mobile device. Thus, a paired relationship is established between the mobile device and the remote device.

Once the wireless communication is established, the two devices may be time synchronized at step 305. In general, at the time that synchronization is being established, the two devices establish a key based on the time of the synchronization. Such a key will be used to initially establish security at step 307 as well as used to enable or disable security features during subsequent operation of the now protected mobile device. One specific method for establishing synchronization is discussed in greater detail with respect to FIG. 4.

Figure 4:
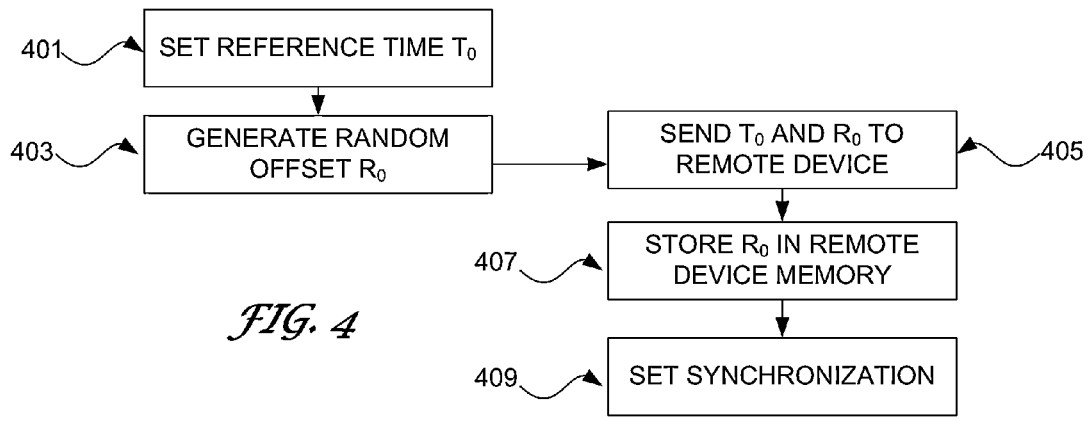
FIG. 4 shows a flow chart diagram of a method for synchronizing mobile device security using the remote device of FIG. 1 and a paired mobile device according to an embodiment of the subject matter discussed herein.

FIG. 4 shows a flow chart diagram of a method for synchronizing mobile device security using the remote device 105 of FIG. 1 and a paired mobile device according to an embodiment of the subject matter discussed herein. In FIG. 3, the step of synchronization 305 is expanded upon here. Thus, as the synchronization process begins at step 401, an initial time reference $T_0$ is established at the mobile device. Next at step 403, a companion circuit in the mobile device generates a random number offset $R_0$ that may be mathematically added to the initial time reference $T_0$ to establish a common time reference $T_1$. Therefore, $T_1=T_0+R_0$. The common time reference $T_1$ and the random number offset $R_0$ may then be stored in a memory in the mobile device e.g., an EEPROM that is part of the SIM card of the mobile device.

Next at step 405, the common time reference $T_1$ and the random number offset $R_0$ may be sent to the remote device using the already established wireless communication channel. And, at step 407, the random number offset $R_0$ is also stored in the SIM card of the remote device (an EEPROM, for example). The encryption process may then use this stored common reference time $T_1$ as a component within an encryption/decryption security method. Because this random number offset is only common to the mobile device and the remote device during this synchronization process, all further encryption/decryption may flow from a function of these mutually stored random number offsets $R_0$.

For example, during each communication between the mobile device and the remote device, a specific key $K_t$ that is a function of the common reference time T1=T0+R0 may be generated and used. Then, using a known encryption method, such as a CIFER key generation algorithm, stored in the memory of the SIM card of the mobile device, a complete set of code tables may be used in the message exchanges between the mobile device and the remote device.

As is known, other encryption methods may be used, such as a Vernan Cifer encryption method, as one well recognized method for banking applications that may utilize credit card payments and automated teller machine transactions. Nevertheless, the embodiments discussed herein are independent of the encrypting methods, as long as the codes and keys are established in same way in the SIM cards of the mobile device and the remote device.

Figure 5:
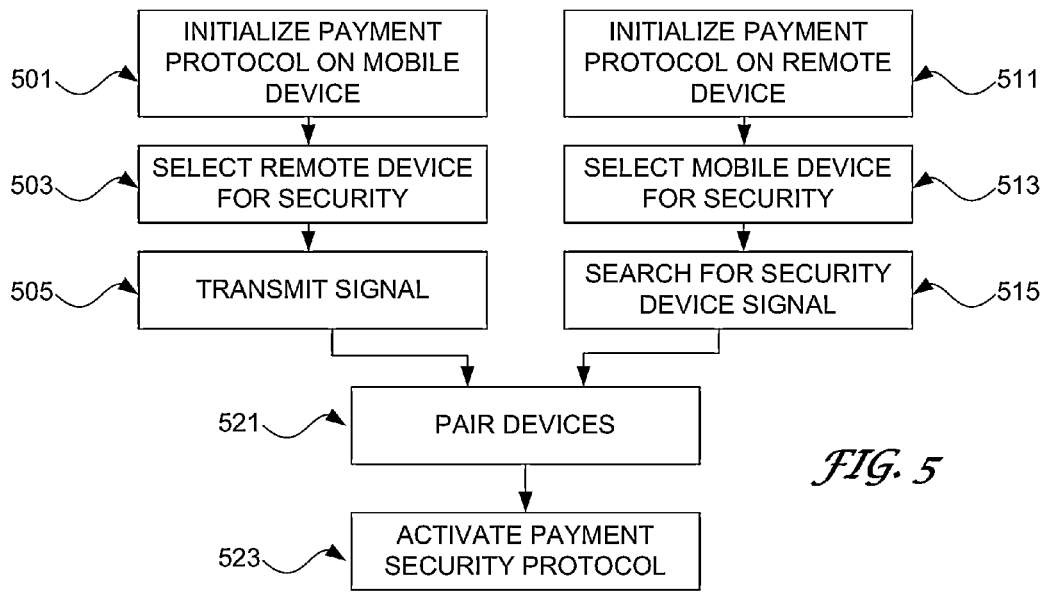
FIG. 5 shows a flow chart diagram of a method for activating a payment security protocol between the remote device of FIG. 1 and a paired mobile device according to an embodiment of the subject matter discussed herein.

FIG. 5 shows a flow chart diagram of a method for activating a payment security protocol between the remote device of FIG. 1 and a paired mobile device according to an embodiment of the subject matter discussed herein. Similar to the pairing procedure discussed above for implementing an encryption security method between a pair of devices with sibling SIM cards, additional security measures may be taken for additional tasks. One such task is a financial transaction, such as a mobile banking money transfer or a credit card transaction using a smart phone. One may wish to provide additional security for such transactions by requiring an action on behalf of the owner of the mobile device in which the financial transaction is being invoked. Thus, once the mobile device is ready to invoke a financial transaction, a final step of acknowledging the transaction by pressing and enable button on a paired remote device may be required.

Therefore, to establish such a protocol for payment activation between a mobile device and an associated remote device, one may follow the procedural steps of FIG. 5. First, the payment protocol pairing application is initialized on the mobile device at step 501 which allows the mobile device to begin scanning for local wireless signals of possible remote devices (having a sibling SIM card) with which to pair. Simultaneously, a remote device may also be initialized in a similar manner at step 511 and also scan for signals from local mobile devices. Then each device (the mobile device and the remote device) may recognize the other's initial signal which may be displayed on a display at each respective device, however, the remote device may not have a display such that a simple indicator light may be used to acknowledge recognition of a mobile device. These steps occur reciprocally and simultaneously at steps 503 and 513 respectively. Alternatively, such a pairing may be accomplished unilaterally as the remote device may not need to acknowledge receipt of a pairing signal from the mobile device.

Thus, in this embodiment, the mobile device may send a pairing request signal at step 505 and the remote device may receive the pairing signal at step 515. Then at step 521, the devices may then be paired such that a financial transaction security protocol may be implemented at step 523.

Once paired and initiated, a financial transaction security protocol provides an additional level of security when a user accesses a banking or payment application. Prior to invoking any transactions, the mobile device application may send a message to the remote device for a second identification of the owner. This message may typically be small on the order of <1 kb of data and may also be encrypted by using the code algorithm stored in mobile device SIM card as well as the common reference time. This message is then received by the remote device and decrypted by the remote device microcontroller by using the same algorithm and the corresponding codes (keys) inserted in the EEPROM of the sibling SIM card of the remote device.

Then, an operator may acknowledge and accept the transaction by pushing the enable button of the remote device. Additionally, the operator may choose to not allow the transaction by pushing the disable button. When the enable button has been pushed, the remote device initiates a reply message that is also encrypted. This encryption follows the same method as the initial message, with a new set of key and variable code as function the reference time. Similarly, the mobile device receives this reply message. If no message received by the mobile device within a limited amount of time (10 seconds, for example), then the mobile device application may repeat the procedure again. This procedure may be repeated several times in a similar manner, up to a fixed maximum (3 times, for example) or until a proper enable or disable reply has been received.

Additional security measures may also be implemented. After one or more failed attempts at a financial transaction, the mobile device may cease the financial application and initiate a stop-payment service or terminate internet access. Further, an associated service (executing at a server computer away from the mobile device) may send an alert SMS message to the mobile phone and/or to a third-party service provider (e.g., a bank). The Service provider signified may try to contact the mobile device owner (perhaps even through the mobile device) to investigate and confirm any potential misuse. Further yet, the mobile device may be locked out after a requisite number of tries such that the mobile device may only be unlocked by a separate owner PUK (personal unblocking code) or by a third party service provider (a wireless provider, for example).

In another embodiment, a mobile device user may initiate a close-owner security mode wherein the mobile device may require continuous pinging communication with a remote device. In this embodiment, the mobile device may send a short encrypted message to a nearby remote device once every specific interval of time—one minute, for example. If a paired remote device is nearby and receives the ping, it may subsequently respond with an encrypted reply message. As the mobile device receives a correct reply to the ping, functionality of the mobile device may remain. However, if no reply message is received after one or more failed ping attempts, the mobile device may enter a protection mode in which financial transactions are prohibited and certain stored data becomes inaccessible behind encryption.

Still other embodiments may implement a continuous ping-echo flow exchange wherein the mobile device and remote device continuously send a message back and forth on the order of one message and one reply every millisecond. If this continuous exchange is interrupted, then the mobile phone may enter a protection mode. Even, in this continuous ping-echo exchange, the size of messages is small enough to consume minimal power allowing lengthy power autonomy of the remote device.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A device, comprising:
a first subscriber identity module having a first time-synchronized key;
a memory configured to store data;
a communications module coupled to the memory and configured to detect a remote device; and
a controller coupled to the memory and configured to:
operate the communications module to establish a pairing relationship with the remote device;
determine a common time reference as a function of an initial time for said pairing and a random value;
calculate said first time-synchronized key as a function of the common time reference;
operate the communications module to transfer the random value to the remote device, said remote device operable to calculate a second time-synchronized key using the transferred random value; and
determine if the remote device includes a second subscriber identity module having the second time-synchronized key that matches the first time-synchronized key of the first subscriber identity module.

2. The device of claim 1, wherein the data stored in the memory is encrypted.

3. The device of claim 2, wherein if the controller determines that the first and second subscriber identity modules match, then decrypting the stored data.

4. The device of claim 1, further comprising a device from the group including: a smart phone, a cellular phone, a laptop computer; a hard drive, a portable flash drive, and a personal data assistant.

5. The device of claim 1, further comprising a device configured to authorize a financial transaction if and only if the first and second time-synchronized keys are determined to match.

6. The device of claim 1 wherein the communications module is configured to communicate using a wireless Bluetooth wireless method.

7. A remote device, comprising:
a first subscriber identity module having a first time-synchronized key;
a communications module coupled to the first subscriber identity module and configured to:
wirelessly communicate with a second device to establish a pairing relationship;
receive from said second device a random value, wherein said random value is used by said second device to calculate a second time-synchronized key derived from a common time reference set as a function of an initial time for said pairing and said random value; and
a controller coupled to the communications module and configured to calculate the first time-synchronized key as a function of the received random value for use in determining if the second device includes a second subscriber identity module that is synchronized with the first subscriber identity module by the first and second time-synchronized keys matching.

8. The remote device of claim 7, further comprising a power button coupled to the controller and configured to initiate different power modes for the remote device.

9. The remote device of claim 7, further comprising an enable button coupled to the controller and configured to authorize a data transaction.

10. The remote device of claim 7, further comprising a disable button coupled to the controller and configured to disallow a data transaction.

11. The remote device of claim 7, further comprising a power management circuit coupled to the controller and configured to manage power consumption in the remote device.

12. The remote device of claim 7, further comprising a clock coupled to the controller and configured to provide clocking operation for the controller.

13. The remote device of claim 7, further comprising one of the group including: a keychain, wrist watch, a credit card, a smart phone, a personal data assistant, a necklace, and an earpiece.

14. A system, comprising:
a first device, comprising:
a first controller;
a first subscriber identity module coupled to the first controller;
a memory coupled to the first controller configured to store data; and
a first communications module coupled to the first controller;
wherein the first controller is configured to:
establish a pairing relationship with a second device;
determine a common time reference as a function of an initial time for said pairing and a random value;
calculate a first time-synchronized key as a function of the common time reference; and
transfer the random value to the second device, said second device operable to calculate a second time-synchronized key using the transferred random value; and
the second device comprising:
a second controller;
a second subscriber identity module coupled to the second controller; and
a second communications module coupled to the second controller;
wherein the second controller is configured to calculate a second time-synchronized key using the transferred random value;

wherein matching of the first and second time-synchronized keys facilitates communications between the first communications module to the second communications module.

15. A method, comprising:
   establishing a pairing relationship between a remote device and a device having encrypted data;
   determining, by the device, a common time reference as a function of an initial time for said pairing and a random value;
   calculating a first time-synchronized key by said device as a function of the common time reference;
   transferring, by the device, the random value to said remote device;
   calculating a second time-synchronized key by said remote device as a function of the transferred random value;
   determining, by the device, if the first and second time-synchronized keys match; and
   if the first and second time-synchronized keys match, then decrypting by the device of the encrypted data.

16. The method of claim 15, further comprising using a wireless communication protocol to establish the pairing relationship between the device and the remote device.

17. The method of claim 16, wherein the wireless communication protocol is Bluetooth.

18. The method of claim 15, further comprising disallowing decryption of the data if the first and second time-synchronized keys do not match.

19. The method of claim 15, further comprising enabling a financial transaction using the device if the first and second time-synchronized keys match.

20. A method, comprising:
   initiating a wireless transaction at a device, the wireless transaction protected by a security protocol;
   detecting a remote device having a key for the security protocol;
   determining if the remote device includes a subscriber identity module that is time-synchronized with a subscriber identity module in the device; and
   if the remote device is synchronized, then allowing the wireless transaction;
   wherein determining time-synchronization between the subscriber identity modules comprises:
   determining, by the device, a common time reference as a function of an initial time for said detecting and a random value;
   calculating a first time-synchronized key by said device as a function of the common time reference;
   transferring, by the device, the random value to said remote device;
   calculating a second time-synchronized key by said remote device as a function of the transferred random value; and
   determining, by the device, if the first and second time-synchronized keys match.

21. The method of claim 20, wherein the wireless transaction is a financial transaction.

22. The method of claim 21, further comprising determining that an enable function has been actuated at the remote device.

23. The method of claim 21, further comprising determining that a disable function has been actuated at the remote device and in response, disallowing the transaction.

24. A non-transitory computer readable storage medium having computer executable instructions that, when executed by a device, are operable to:
   establishing a pairing relationship between a remote device and the device having encrypted data;
   determining, by the device, a common time reference as a function of an initial time for said pairing and a random value;
   calculating a first time-synchronized key by said device as a function of the common time reference;
   transferring, by the device, the random value to said remote device;
   calculating a second time-synchronized key by said remote device as a function of the transferred random value;
   determining, by the device, if the first and second time-synchronized keys match remote; and
   if the first and second time-synchronized keys match, then decrypting by the device of the encrypted data.

25. A non-transitory computer readable storage medium having computer executable instructions that, when executed by a device, are operable to:
   initiate a wireless transaction at the device, the wireless transaction protected by a security protocol;
   detect a remote device having a key for the security protocol;
   determine if the remote device includes a subscriber identity module that is time-synchronized with a subscriber identity module in the device; and
   if the remote device is synchronized, then allow the wireless transaction;
   wherein the time-synchronization determination between the subscriber identity modules comprises:
   determining, by the device, a common time reference as a function of an initial time for said detecting and a random value;
   calculating a first time-synchronized key by said device as a function of the common time reference;
   transferring, by the device, the random value to said remote device;
   calculating a second time-synchronized key by said remote device as a function of the transferred random value; and
   determining, by the device, if the first and second time-synchronized keys match.

* * * * *